(12) United States Patent
Koizumi

(10) Patent No.: US 6,466,201 B1
(45) Date of Patent: Oct. 15, 2002

(54) KEYBOARD KEYS OR MOUSE BUTTONS WITH ACTIVE REBOUND

(75) Inventor: David Koizumi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,103

(22) Filed: Dec. 21, 1999

(51) Int. Cl.$^7$ ................................................. G09G 5/00
(52) U.S. Cl. ........................ 345/168; 345/172; 400/495
(58) Field of Search ........................... 345/161, 162, 345/163, 168, 169, 172; 200/341, 345, 512, 517, 520, 521, 530, 539, 471–472; 341/22–23; 400/714–715, 485–489, 491, 472, 491.3, 494, 495

(56) References Cited

U.S. PATENT DOCUMENTS

| | | | | |
|---|---|---|---|---|
| 5,251,529 A | * | 10/1993 | Burgett | 84/423 R |
| 5,298,706 A | * | 3/1994 | English et al. | 200/517 |
| 5,715,932 A | * | 2/1998 | Motoyama et al. | 200/521 |
| 5,783,765 A | * | 7/1998 | Muramatsu | 84/615 |
| 5,790,098 A | * | 8/1998 | Lin | 345/163 |
| 5,895,875 A | * | 4/1999 | Osuga et al. | 84/423 R |
| 5,982,357 A | * | 11/1999 | Burgett et al. | 345/168 |
| 6,166,723 A | * | 12/2000 | Schena et al. | 345/184 |

* cited by examiner

*Primary Examiner*—Bipin Shalwala
*Assistant Examiner*—Mansour M. Said
(74) *Attorney, Agent, or Firm*—Fish & Richardson P.C.

(57) ABSTRACT

An active rebound circuit has a device that assists users lift their finger upward to relieve some repetitive motion stress. The device is configured to respond with a rebound force when a user's finger applies a particular force to the device. The rebound force is sufficient to provide substantial reduction in work expended in moving the finger in the opposite direction to the particular force applied by the user's finger.

14 Claims, 6 Drawing Sheets

KEYBOARD KEYS OR MOUSE BUTTONS WITH ACTIVE REBOUND

BACKGROUND

The present invention relates to input devices, such as a keyboard, a mouse, or other devices having keys or buttons. More specifically, this relates to an active rebound system for such input devices.

Keyboards, an essential part of most computer systems, are responsible for the substantial majority of computer-related injuries. Many computer keyboards are based on typewriter models. They often do not take human needs and physiology into account.

Repetitive Stress Syndrome conditions, such as Carpal Tunnel Syndrome, are common repetitive motion injuries attributed to the use of computer peripheral devices that require repetitive finger motions. To relieve muscle strains that cause these injuries, arms should point straight down and then bend into right angles at the elbows. However, most typists force their arms and wrists into uncomfortable and unnatural positions. These positions cause inflammation of delicate muscles and consequently apply pressure against the nerves that pass through a narrow sheath called the carpal tunnel.

SUMMARY

An active rebound circuit has a device that assists users to lift their fingers upward to relieve some repetitive motion stress. The device is adapted to respond with a rebound force when a first force is applied to the device. The rebound force should be effective to provide reduction in work expended in applying a second force in an opposite direction to the first force.

BRIEF DESCRIPTION OF THE DRAWINGS

Different aspects of the present invention will be described in reference to the accompanying drawings wherein.

DETAILED DESCRIPTION

Some of the computer-related repetitive motion injuries can be minimized by the use of keyboard keys or mouse buttons that preclude the need for antagonistic muscle use. These muscles involve repetitive opposite direction motions that require the muscles to contract simultaneously. For example, the human hand is adapted for grasping. Thus, the fingers are built for clutching objects. The fingers, therefore, often exert substantially more force inward than outward.

Figure 1:
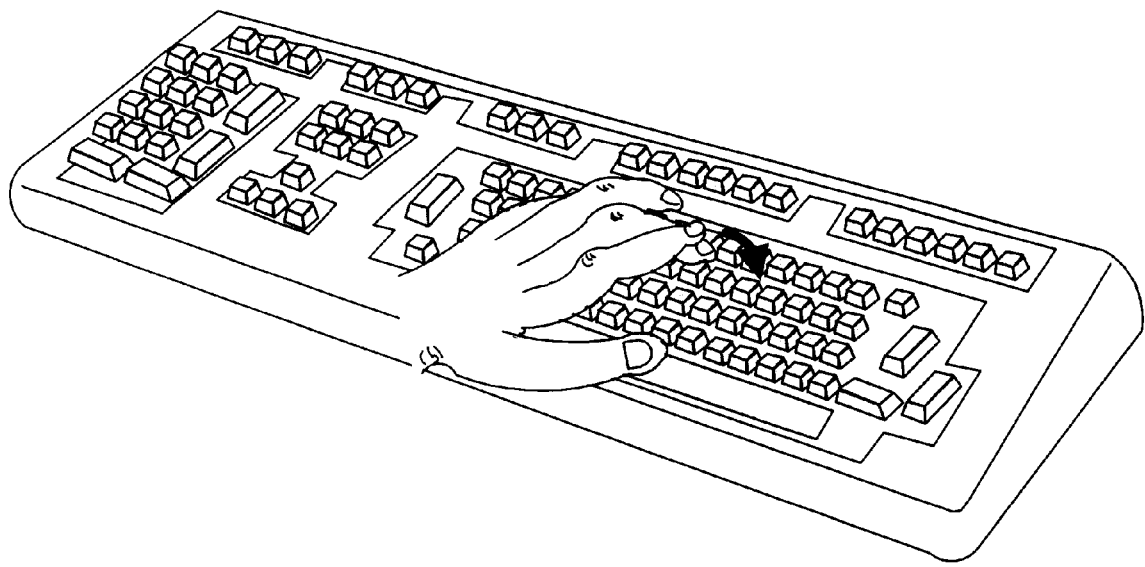
FIG. 1 illustrates the user exerting a relatively large amount of force pressing the keyboard keys downward.
Figure 2:
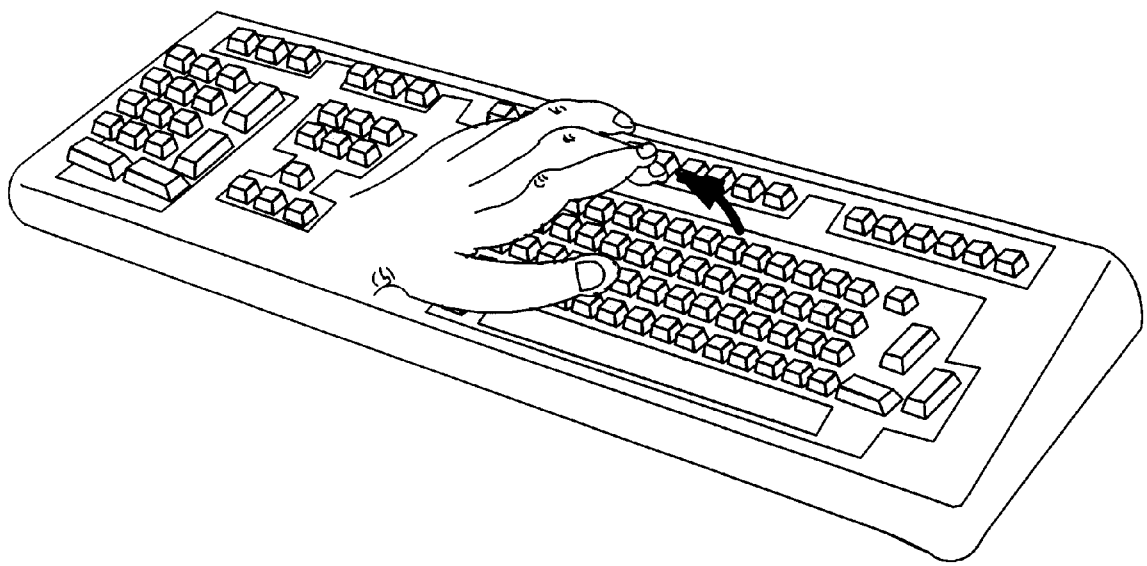
FIG. 2 illustrates the active rebound key system providing an upward force to the user's finger.

FIGS. 1 and 2 illustrate the use of a computer keyboard involving movement of fingers. The fingers, in FIG. 1, exert a relatively large amount of force pressing the keys downward. This large force is due to natural adaptation of human fingers to exert more force inward. However, the rebound of the keys is currently dependent on a passive spring or foam type material. This passive rebound material returns a small fraction of the energy to the hand and finger that was expended to press the key downward. Therefore, a substantial portion of the work expended in the use of keyboard involves lifting the fingers and hand, especially at high key press repetition rates. This often leads to poor keyboard use habits through repetitive wrist flexing, which may lead to possible repetitive stress injuries.

The present disclosure describes an active rebound key. This circuit assists users in lifting their fingers upward. An active circuit in the rebound key can substantially reduce the work involved in moving the mass of a finger up and down repetitively. This repetitive motion may generate more than 40 repetition cycles per minute per finger.

Figure 3:
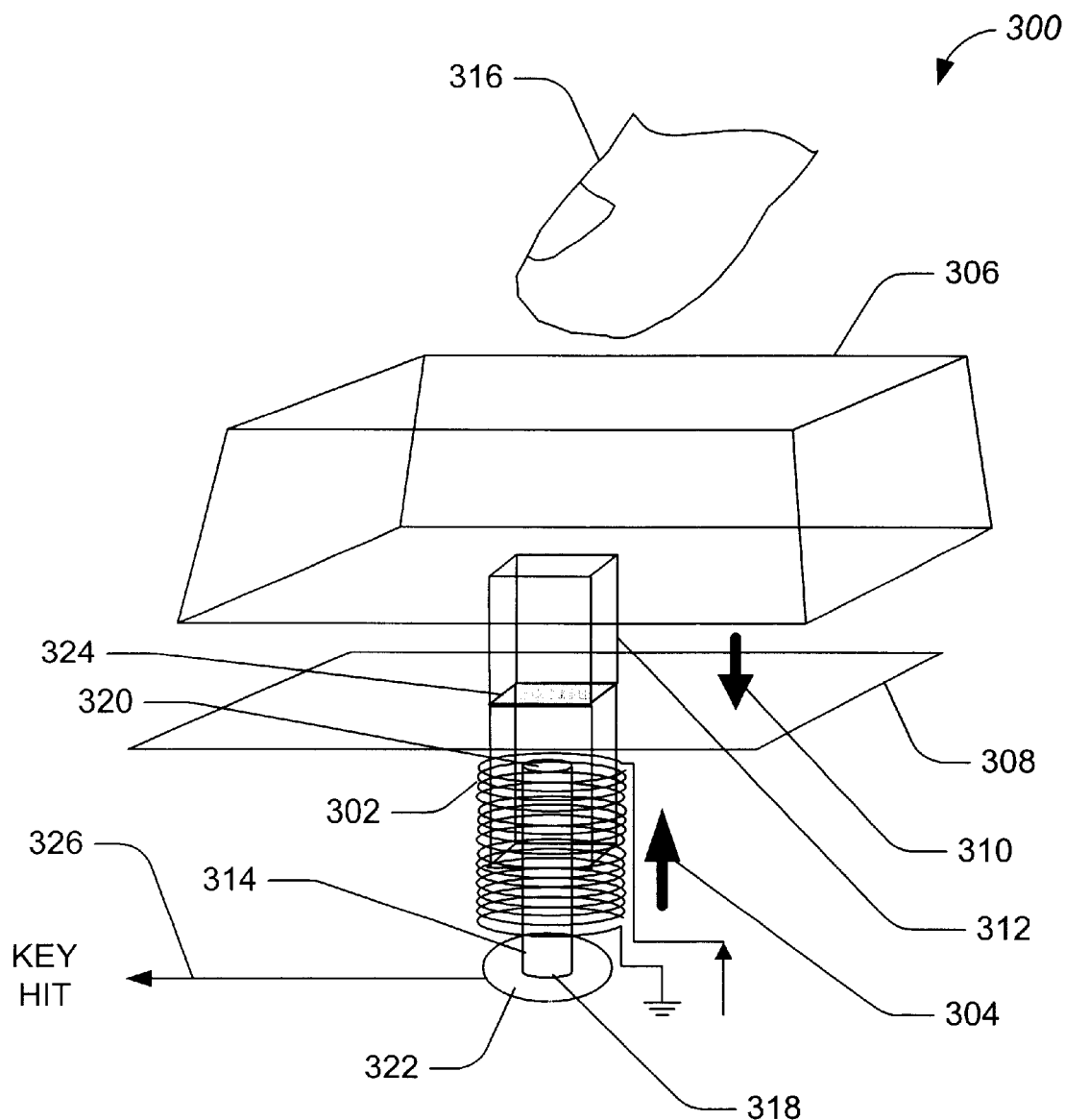
FIG. 3 shows an active rebound circuit according an embodiment of the present invention.

One embodiment of the active rebound circuit 300 is shown in FIG. 3. When the user's finger 316 presses down on a key 306, a downward force 310 causes an attached plunger 312 to slide along a rod, such as an iron armature 314. The armature 314 has a proximal end 320 and a distal end 318. The distal end 318 is attached to a conductive support 322. When the force 310 applied to the key 306 is sufficient, the proximal end 320 of the armature 314 makes contact with a conductive patch 324 on a key switch assembly 308. Therefore, the key switch assembly 308 and the armature 314 act as a contact switch.

When the armature 314 makes contact with the patch 324, a signal 326 is sent that identifies the pressed key 306. The signal 326 that indicates the pressed key also triggers a solenoid of field coil 302 built into the circuit 300. The solenoid 302 directs an active short duration upward force 304 to the key 306., which provides an active rebound. The upward assist provided by a keyboard equipped with such keys would alleviate much of the antagonistic muscle use. The average user can press the same key with the same finger approximately every 150 milliseconds for a short duration. Therefore, the alleviation is especially important when the same key is being pressed repetitively, such as the left mouse button or the space bar on the keyboard.

In some embodiments, the rebound force and speed can be altered to suit the specific fingers of the human hand. The two fingers with the most different mass and strength are the thumb and 5th finger. The 5th finger is used to press the Return key (often referred to as the Enter or Carriage Return key) in a standard QWERTY keyboard. The thumb is used to press the space bar, which is one of the most frequently and repetitively pressed keys. A keyboard with user settable rebound allows users to set the rebound force to the most comfortable level for each finger of the hand.

Figure 4:
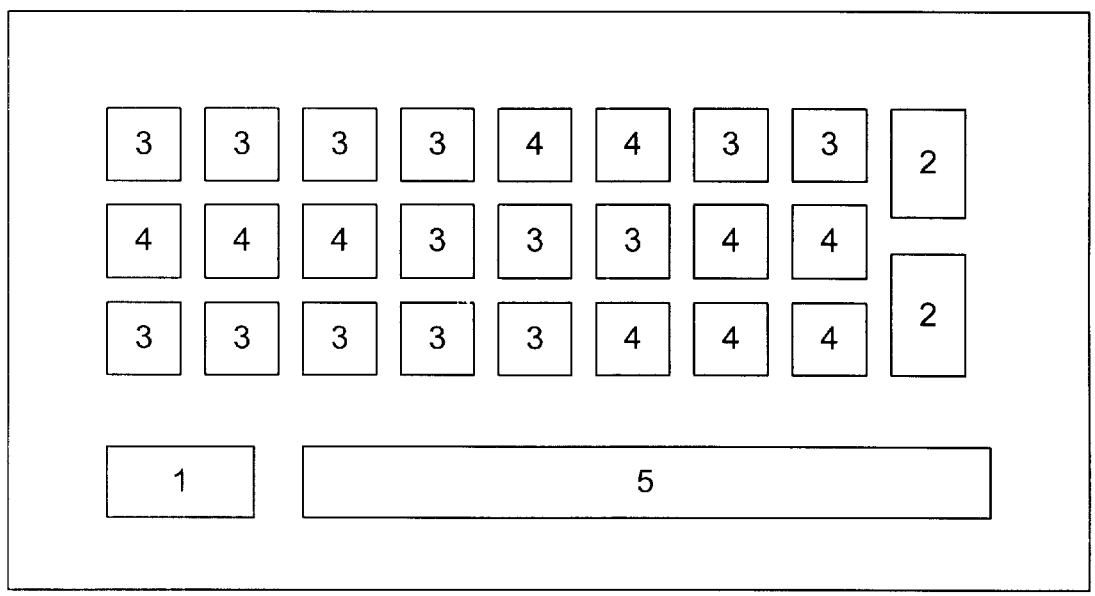
FIG. 4 shows a rebound force setting according an embodiment of the present invention.

In other embodiments, preferred rebound force settings for a specific user are saved in a file. A computer uses this file to control the rebound system of the keyboard or other devices. Keyboards that have a stand-alone active rebound system use a separate small micro-controller and memory system to store individual force setting maps, such as shown in FIG. 4.

In another embodiment, the rebound settings are dynamically altered depending on typing patterns. For example, repetitive pressing of a key by the same finger is often the most tiring and stressful. Therefore, when the user is deliberately pressing the same key repetitively (but not holding the key down so that it electronically auto-repeats), a controller can dynamically increase the rebound level. The level increase depends on the rate of repeated pressing.

In further embodiments, the rebound settings are altered depending on how long the user holds a key down. For example, modifier keys, such as the Shift or Control keys, are held down longer than character keys. Thus, the programmed rebound settings are reduced for these keys. In another embodiment, the rebound settings are reduced when the text is being typed deliberately slowly to avoid errors or when typing long and difficult words.

Figure 5:
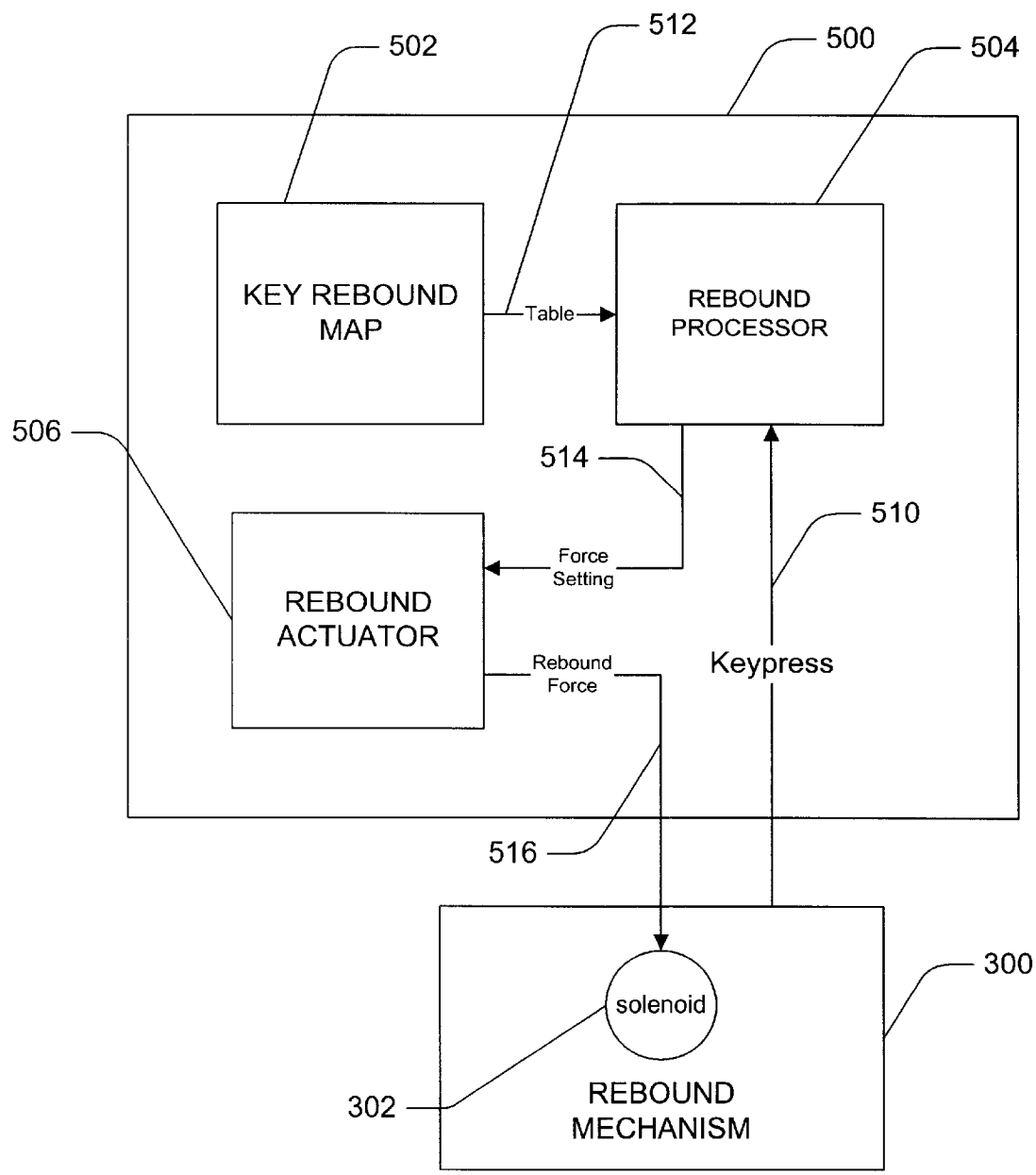
FIG. 5 is a block diagram of an active rebound system according an embodiment of the present invention.

FIG. 5 is a block diagram of an active rebound system 500 according an embodiment of the invention. The embodiment 500 includes a key rebound map 502, a processor 504, an actuator 506, and an active rebound circuit 300. The key rebound map 502 includes a table of rebound force settings. The settings can be determined using one of the methods described above. The rebound processor 504 selects an appropriate rebound force setting for a particular key press 510 on a keyboard. The processor 504 selects the setting from a table 512 received from the rebound map 502. The selected force setting 514 is sent to the rebound actuator 506.

The rebound actuator 506 converts the rebound force setting received from the rebound processor 504 into an electrical signal sufficient to provide active rebound to the pressed key. The electrical signal 516 representing the rebound force is applied to the solenoid 302 in the active rebound circuit 300.

Figure 6:
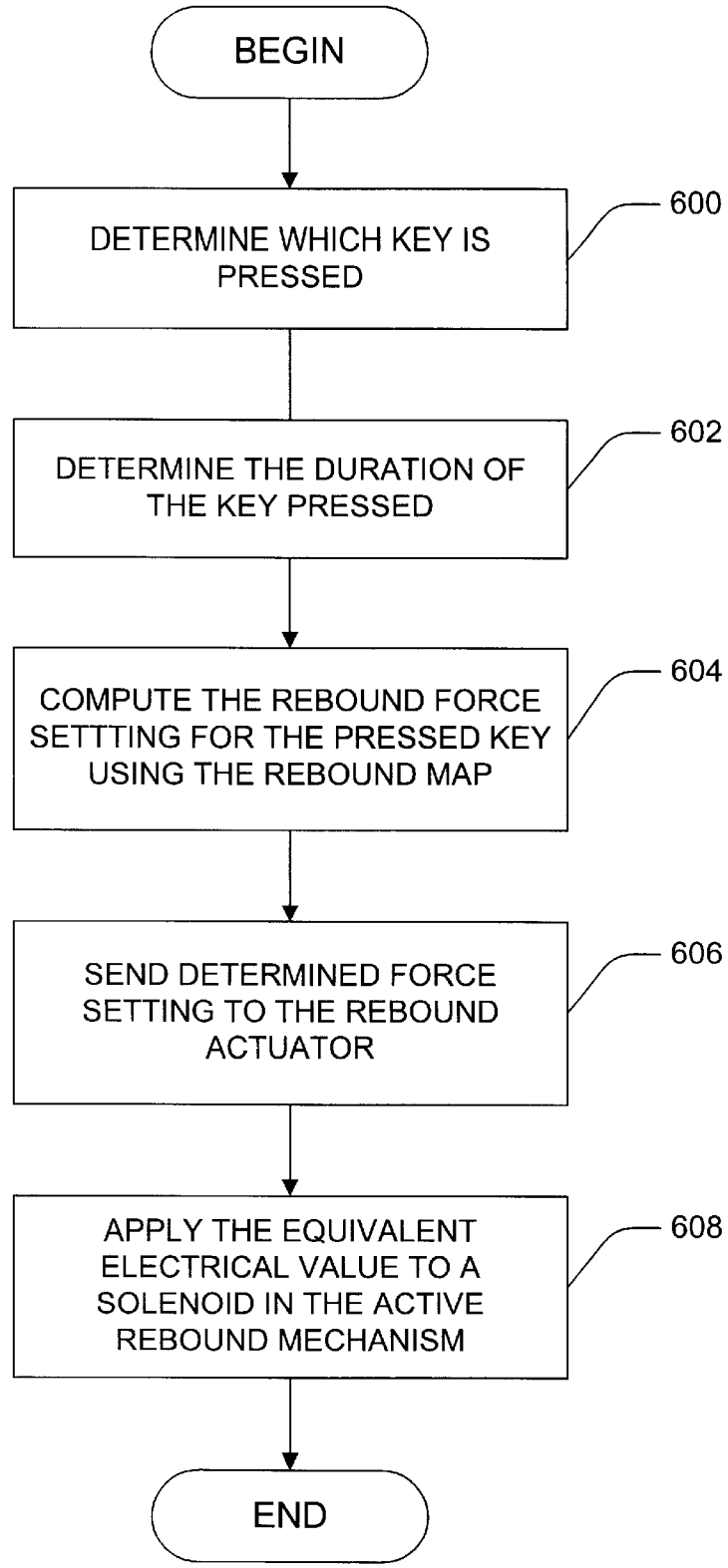
FIG. 6 is a flowchart of the rebound force determination and application process.

FIG. 6 is a flowchart of the rebound force determination and application process according to an embodiment of the present invention. The processor determines which key is pressed, at step 600. The processor also determines the duration of the key pressed, at step 602. At step 604, the processor computes the rebound force setting for the pressed key using the rebound map. The processor then sends the determined force setting to the rebound actuator, at step 606. The rebound actuator applies the equivalent electrical value to the solenoid in the active rebound circuit.

Figure 7:
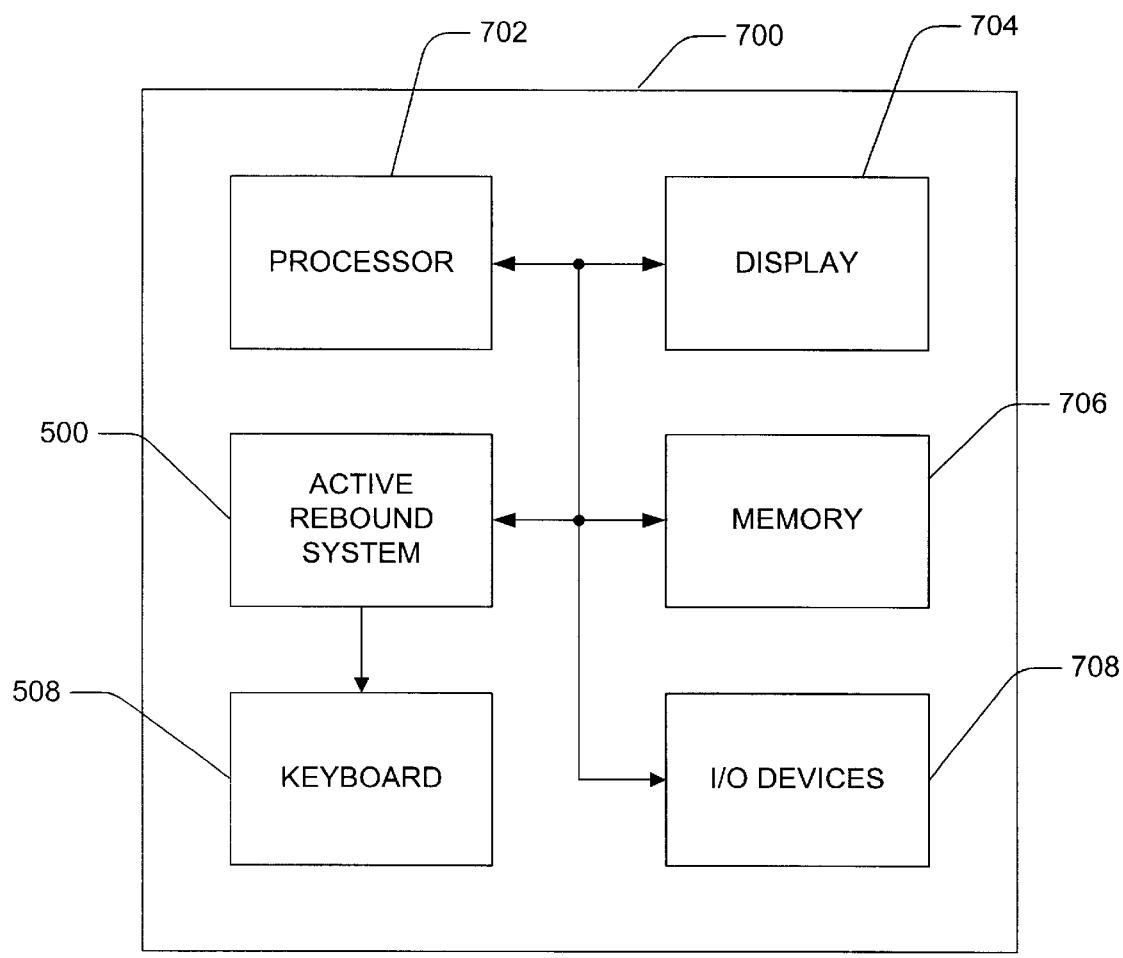
FIG. 7 is a block diagram of a computer system having an active rebound system.

FIG. 7 shows a block diagram of a computer system 700 including an active rebound system 500 having a rebound circuit 300 according an embodiment of the present invention. The computer system 700 also includes a processor 702, a display 704, a memory 706, and input/output (I/O) devices 708. The active rebound system 500 provides rebound force to assist users in lifting their fingers upward. A rebound circuit in the key substantially reduces the work involved in moving the mass of a finger up and down repetitively.

Other embodiments are within the scope of the following claims. For example, the control functions to allow users to alter the parameters of the rebound to their preferences can be applied using Universal Serial Bus (USB) connection. Further, the active rebound circuit can be used in applications other than computer keyboards, such as in computer mice, electronic music keyboards, and piano keyboards. Also, the key switches used may be of the electrical contact variety or of the contact-free variety, such as Hall-Effect switches or capacitive switches.

What is claimed is:

1. A rebound system for a keyboard including a plurality of keys, said system comprising:
    a rebound circuit for each of a plurality of keys in the keyboard, each of said circuits including a device that is adapted to respond with a rebound force when a particular force is applied to said device;
    a rebound map having a set of rebound force settings corresponding to a plurality of said rebound circuits, at least two of said settings being different; and
    a processor adapted to select a force setting from said set of rebound force settings in response to application of said particular force to one of said devices.

2. The system of claim 1, further comprising:
    an actuator adapted to convert said rebound force setting into an electrical signal sufficient to provide said rebound force in said rebound circuit.

3. The system of claim 2, further comprising:
    a solenoid in the rebound circuit, said solenoid receiving said electrical signal from the actuator, said solenoid applying rebound force to said device.

4. The system of claim 1, further comprising:
    a switch in the rebound circuit, said switch capable of being activated by said particular force.

5. The system of claim 1, wherein said keyboard is a computer or electronic music keyboard.

6. The system of claim 1, wherein said rebound circuit further includes an element that provides said rebound force for said key, said element capable of selectively setting different rebound force levels.

7. The system of claim 6, wherein said rebound circuit further includes a memory storing a keyboard map that stores preferred rebound force levels for at least a plurality of users.

8. The system of claim 6, wherein said processor is further operative to detect said first force and dynamically altering said rebound force levels according to typing patterns of a user.

9. A method for applying appropriate rebound force to a key or button, comprising:
    determining a key-press;
    accessing a key rebound map including a plurality of rebound force settings, at least two of said settings being different;
    computing a rebound force appropriate for said key-press using at least one value in said key rebound map; and
    applying an electrical value equivalent to said rebound force.

10. The method of claim 9, further comprising:
    determining a duration of key presses.

11. The method of claim 10, wherein said computing rebound force takes into account said duration of key press.

12. The method of claim 9, wherein said computing rebound force includes selecting a force setting from a set of force settings in said key rebound map.

13. An apparatus comprising a machine-readable storage medium having executable instructions for determining and applying active rebound force to a key or button that enables the machine to:
    determine a key-press;
    access a key rebound map including a plurality of rebound force settings, at least two of said settings being different;
    compute a rebound force appropriate for said pressed key according to said key rebound map; and
    apply an electrical value equivalent to said rebound force to said key or button.

14. A computer system comprising:
    a keyboard including a plurality of keys and with a rebound system adapted to respond with a rebound force when a first force is applied to one of said plurality of keys;
    a memory device including a rebound map having a set of rebound force settings corresponding to a plurality of said keys, at least two of said settings being different; and
    a processor adapted to select and process a rebound force from said set of rebound force settings in response to application of said particular force to said device.

* * * * *